(No Model.) 2 Sheets—Sheet 1.
J. TIMMINS.
CUTTER ATTACHMENT FOR HOES.
No. 580,068. Patented Apr. 6, 1897.
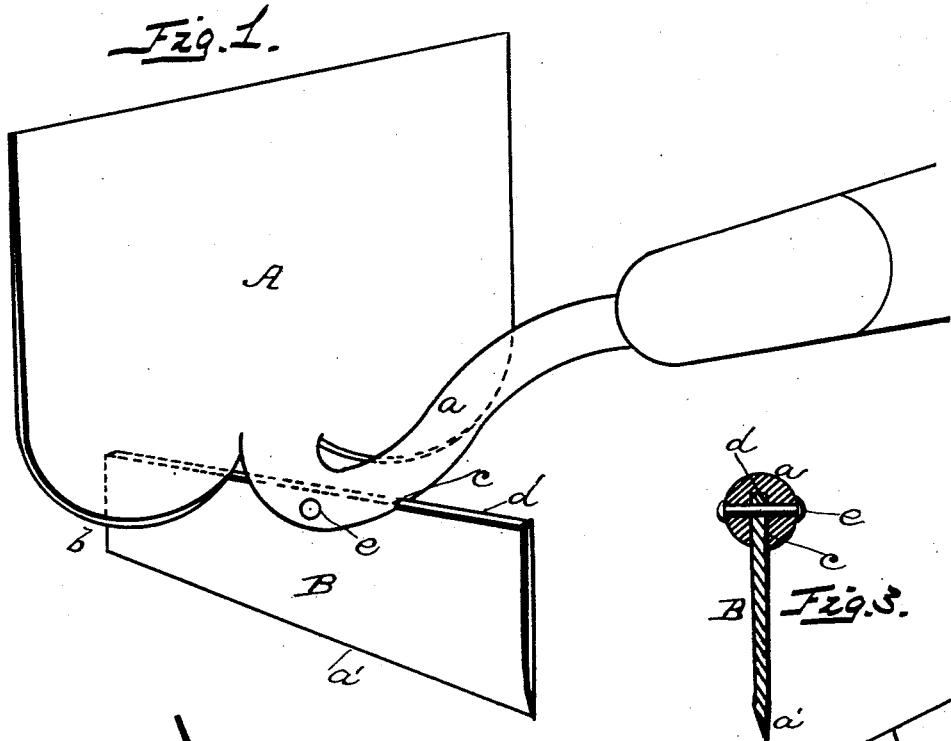
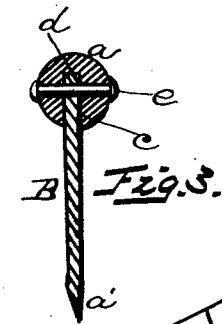
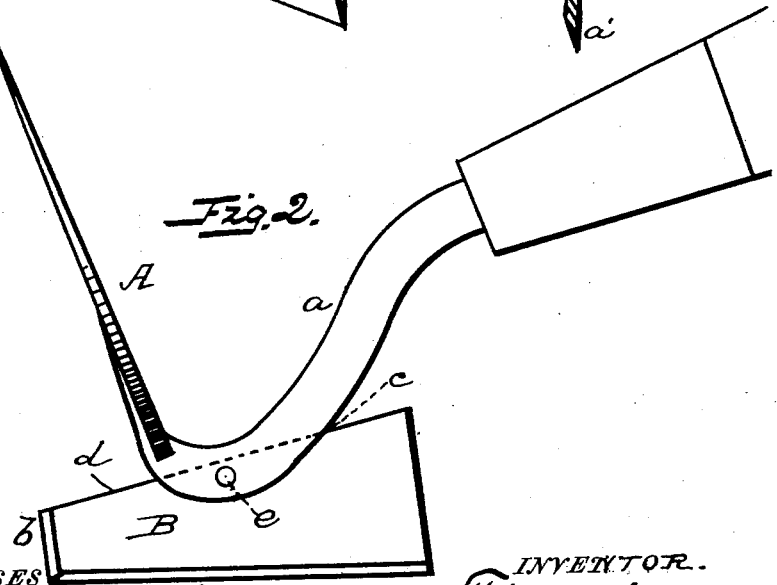
WITNESSES
James B. Clarke
M. M. Morton
INVENTOR
John Timmins
by E. H. Bates Attorney

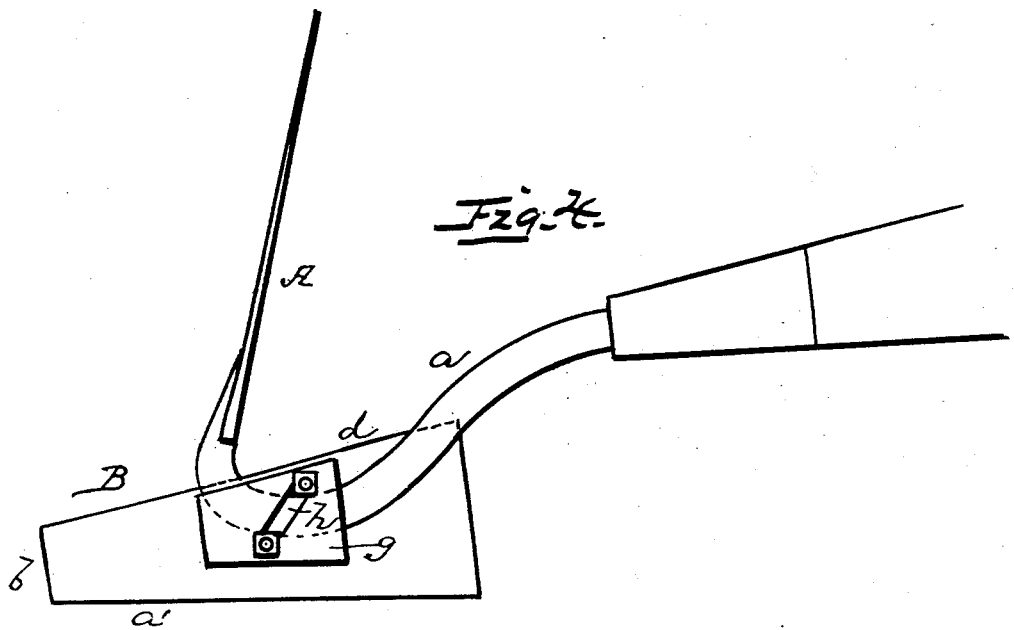
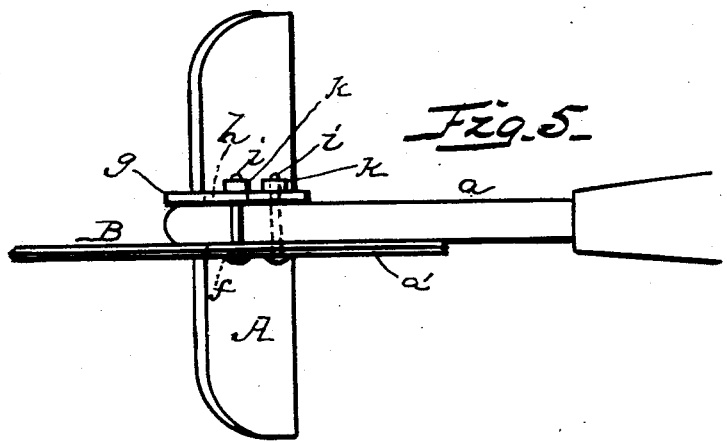

UNITED STATES PATENT OFFICE.

JOHN TIMMINS, OF LEONIA, NEW JERSEY.

CUTTER ATTACHMENT FOR HOES.

SPECIFICATION forming part of Letters Patent No. 580,068, dated April 6, 1897.

Application filed October 21, 1896. Serial No. 609,506. (No model.)

*To all whom it may concern:*

Be it known that I, JOHN TIMMINS, a citizen of the United States, residing at Leonia, in the county of Bergen and State of New Jersey, have invented certain new and useful Improvements in Cutter Attachments for Hoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in hoes; and it consists in the novel construction and arrangement of a cutting-blade applied to the back or stem of a hoe and used in combination therewith for the purpose of cutting strawberry-runners and also weeds in close proximity to plants without injury to the latter, all as will be hereinafter fully described.

The annexed drawings, to which reference is made, fully illustrate my invention, in which—

Figure 1 represents a perspective view of my device. Fig. 2 is a side view of the same. Fig. 3 is a cross-sectional view through the stem and cutter. Fig. 4 is a side view of a modification of my device, and Fig. 5 is a plan or top view of the same.

Referring by letter to the accompanying drawings, A designates an ordinary hoe, having the usual stem $a$, which is inserted into a handle in the well-known manner.

B indicates the runner-cutter or spud, consisting of a single blade, which is tapering from front to rear, the outer edge $a'$ thereof as well as the point $b$ being sharpened, providing a keen cutting edge for the runners and weeds. This cutting edge inclines from the cutting-point rearwardly, and when the implement is in use in cutting runners the cutting edge is in a longitudinal plane, the handle of the hoe being in an inclined position and in the hands of the operator in the usual manner.

The stem $a$ of the hoe is provided with a kerf $c$, into which the rear edge $d$ of the cutting-blade is fitted, and the same is held firmly in place by a rivet $e$, which passes through perforations in the stem and a perforation in the blade.

In Figs. 4 and 5 I show the blade or cutter clamped to the stem of the hoe, and in this construction the stem has no kerf. Instead thereof the cutting-blade is provided with a slot $f$, and a plate $g$ is provided with a similar slot $h$. The stem of the hoe is placed between the plate $g$ and the cutter-blade, and two bolts $i\ i$ are passed through the slots in both the plate and cutter and are secured by the nuts $k\ k$, thus securely holding or clamping the cutter to the hoe-stem.

It will be seen by reference to the annexed drawings that the blade or cutter extends beyond the hoe, whereby the same can be used as a spud for cutting off weeds with taproots growing near a plant without injuring the roots of the strawberry or other plants, which is often impossible to do with a hoe not having my attachment, and it will be observed that my device is designed more particularly for cultivating strawberries, the plants of which are continually sending out branches or what I denominate "runners," which take root and are surplusage, and in order to cut the same the operator simply turns the hoe over, bringing the blade in position for cutting the runners, which can be accomplished without the operator changing his position of hoeing the row of plants. Frequently several of the branches or runners take root in the ground close together and it is desirable to permit one or two runners to remain, while the others can be readily separated and cut with my device. The ordinary hoe cannot be used for this purpose, and a device as here described and shown is simple in operation, durable, and at the same time cheap to manufacture.

Having thus described my invention, what I claim, and desire to secure by Letters Patent, is—

In combination with a garden-hoe, the cutting-blade having the slot $f$; the plate having the slot $h$ and the bolts and nuts therefor, said blade and plate securely attached to the stem of the hoe all substantially as described and for the purposes specified.

In testimony whereof I affix my signature in presence of two witnesses.

JOHN TIMMINS.

Witnesses:
J. A. LOWE,
GEO. M. BRINKERHOFF.